(12) United States Patent
Taniguchi et al.

(10) Patent No.: US 6,433,519 B2
(45) Date of Patent: Aug. 13, 2002

(54) VOLTAGE CONTROL UNIT FOR VEHICULAR AC GENERATOR

(75) Inventors: Makoto Taniguchi; Keiji Takahashi, both of Kariya; Toshinori Maruyama, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/899,054

(22) Filed: Jul. 6, 2001

(30) Foreign Application Priority Data

Jul. 6, 2000 (JP) ........................................ 2000-205147

(51) Int. Cl.[7] ................................................ H02P 9/14
(52) U.S. Cl. .................................... 322/28; 322/18
(58) Field of Search .......................... 322/25, 27, 28, 322/36, 37, 18

(56) References Cited

U.S. PATENT DOCUMENTS

| | | | |
|---|---|---|---|
| 4,143,289 A | 3/1979 | Williams | 310/156 |
| 4,262,243 A * | 4/1981 | Mori et al. | 322/99 |
| 4,297,631 A | 10/1981 | Nicol et al. | 320/64 |
| 5,182,511 A | 1/1993 | Pierret et al. | 324/158 MG |
| 5,376,876 A | 12/1994 | Bauser et al. | 322/28 |
| 5,493,202 A | 2/1996 | Iwatani et al. | 322/28 |
| 5,602,470 A | 2/1997 | Kohl et al. | 324/177 |
| 5,731,690 A * | 3/1998 | Taniquchi et al. | 322/28 |
| 5,923,095 A * | 7/1999 | Iwatani et al. | 307/10.1 |
| 6,204,643 B1 * | 3/2001 | Kouwa et al. | 322/25 |
| 6,294,899 B1 * | 9/2001 | Tokugawa et al. | 322/28 |
| 6,313,613 B1 * | 11/2001 | Iwatani et al. | 322/12 |

FOREIGN PATENT DOCUMENTS

| | | |
|---|---|---|
| JP | 5083998 | 4/1993 |
| JP | 6284598 | 10/1994 |

* cited by examiner

*Primary Examiner*—Nicholas Ponomarenko
(74) *Attorney, Agent, or Firm*—Oliff & Berridge, PLC

(57) ABSTRACT

In an apparatus for detecting a rotation by utilizing a residual magnetism remaining in a core, when a field current attenuates gradually through a current return diode during a deceleration period for the stop of rotation, there occurs an AC demagnetizing action which causes the field current to attenuate, so that also during the deceleration period, the supply of electric power to a control circuit and field current to a field coil are continued.

7 Claims, 7 Drawing Sheets

VOLTAGE CONTROL UNIT FOR VEHICULAR AC GENERATOR

CROSS REFERENCE TO RELATED APPLICATION

This application is based on and incorporates herein by reference Japanese Patent Application No. 2000-205147 filed on Jul. 6, 2000.

BACKGROUND OF THE INVENTION

1. Field of the Invention

The present invention relates to a voltage control unit used for a vehicular AC generator.

2. Description of Related Art

JP-A-55-127849 and JP-A-6-284598 disclose to detect, during rotation of a revolving-field type alternator, an AC voltage (also called armature coil induced voltage with residual magnetism) which is induced in a field coil as a result of a magnetic flux being modulated with rotation of field poles, the magnetic flux remaining in a core and interlinked with the armature coil, and thereby detecting the rotation of the alternator, i.e., start-up of an engine.

JP-A-3-215200 discloses to detect a potential difference between two-phase voltages out of polyphase AC voltages which are induced by interlinkage of a magnetic flux with a polyphase armature core, the magnetic flux remaining in rotating magnetic poles as constituents of a rotating-field type alternator, thereby detecting the start of rotation.

According to the above conventional power generation detecting prior arts, IG cable is omitted and in the case where an engine does not start despite turning ON of an IG switch, the alternator is not energized.

However, in the above rotation detection based on the armature coil induced voltage with residual magnetism, the residual magnetism of core often becomes small and hence the armature coil induced voltage with residual magnetism is small, so that it is desired to improve the detection reliability.

Similarly, the field coil induced voltage with residual 10 magnetism, which is cased by residual magnetism of the armature core, is influenced by magnetism decline. This is more remarkable.

Generally, since the inductance of a field coil is large, a current return diode is connected in parallel with the field coil to inhibit the occurrence of overvoltage. This means that even when a switching transistor connected in series with a field coil is turned ON, allowing a field current to flow through the field coil, and is thereafter turned OFF, the field current continues to flow in the field coil through the current return diode for as long as several hundred seconds while attenuating. Further, even when fuel injection for an engine is stopped upon turning OFF of the switching transistor and hence upon stop of external power supply to the field coil, the engine and the vehicular AC generator continue to rotate for a predetermined period of time by the force of inertia while slowing down. As a result, various portions of the armature core are magnetized alternately by field poles of opposite polarities of which magnetic field intensity attenuate gradually with attenuation of the field current. Under an AC demagnetizing action which is known well in the field of magnetic recording, the residual magnetism disappears, as shown in FIG. 6.

It has experimentally turned out that when external power supply to a field wirding is stopped under the conditions of time constant τ of the field coil: 200 msec, the number of magnetic poles: 16 and the number of rotation: 2000 rpm, a field current continues to flow while attenuating exponentially for subsequent 200 msec or so. At this time, an attenuated alternating field Hs of 266.66 Hz is applied to the armature core, so that the residual magnetism of the armature core remarkably decreases.

In the detection of an armature coil induced voltage with residual magnetism, residual magnetism of a field core is important. But, since it is influenced by residual magnetism of an armature core and a current field of the armature core, it so much decreases, thereby giving rise to the problem of a lowering in residual magnetism like the armature core.

SUMMARY OF THE INVENTION

An object of the present invention is to provide a voltage control unit for a vehicular AC generator preventing the attenuation of residual core magnetism in the vehicular AC generator, thereby increasing an induced voltage with residual magnetism.

According to the present invention, stop of external power supply to a field coil caused by the stop of power supply to a control circuit is done at least after the stop of a rotor, whereby it is possible to prevent a field current from being attenuated by the foregoing AC demagnetizing action which is attributable to interruption of the power supply to the control circuit before stop of the rotor. As a result, it is possible to prevent the occurrence of the AC demagnetization phenomenon, thereby preventing the decrease of residual magnetism of a core, especially the armature core.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

First Embodiment

Figure 1:
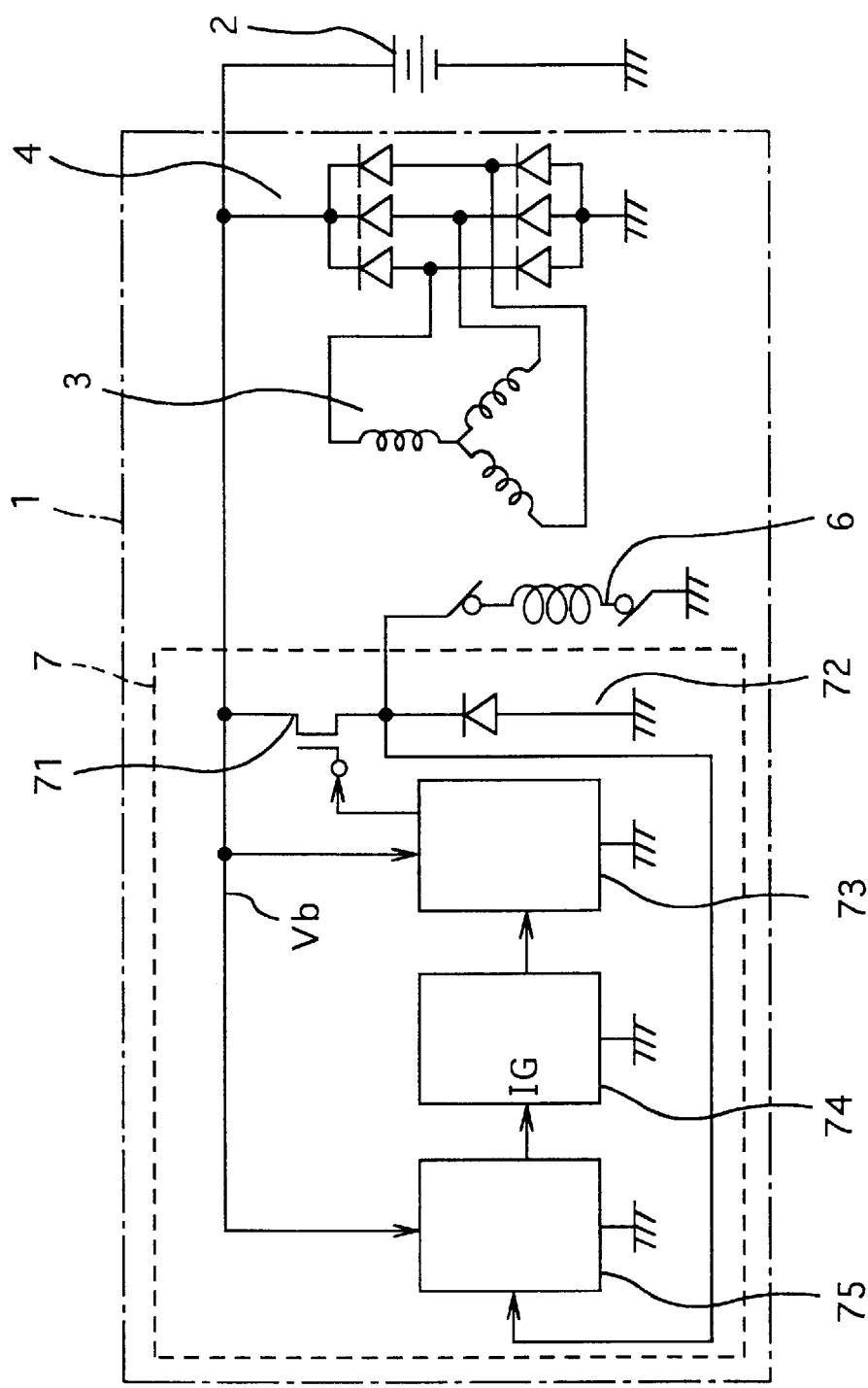
FIG. 1 is a schematic view showing a constitution of the present invention.

FIG. 1 is a block diagram showing a circuit configuration of a vehicular AC generator in the first embodiment.

FIG. 1 shows a vehicular AC generator (alternator) 1, a vehicular battery 2, a three-phase armature coil 3, a full-wave rectifier circuit 4 connected to each phase output terminal of the armature coil 3, a field coil 6 wound around a filed core (not illustrated) having field poles, and a voltage control unit 7 which adjusts a field current and controls the output voltage of the alternator 1 within a predetermined range.

The voltage control unit 7 includes a transistor 71 connected in series with the field coil 6 and turning ON and OFF of field current, a flywheel diode 72 for causing the field current to return when the transistor 71 is made OFF, a control circuit 73 which monitors an output voltage of the full-wave rectifier circuit 4 and produces a signal for driving the power transistor 71 so that the output voltage is within a predetermined range, a power supply circuit 74 for supplying electric power to keep ON of the voltage control circuit 73, and a power supply drive circuit 75 which detects the rotation of a rotor and which produces a signal for driving the power supply circuit 74.

The power supply circuit 74 is a conventional circuit for supplying an electric voltage into the control circuit 73. The power supply circuit 74 may be constituted by a voltage regulator circuit. A supply voltage input to an IG terminal of the power supply circuit 74 may be applied to the control circuit 73. The control circuit 73 includes a comparator which compares a battery voltage with a predetermined regulated voltage and which controls to turn ON and OFF of the transistor 71 in accordance with the result of the comparison. The power supply circuit 74 and the control circuit 73 are the same in the prior art.

Figure 2:
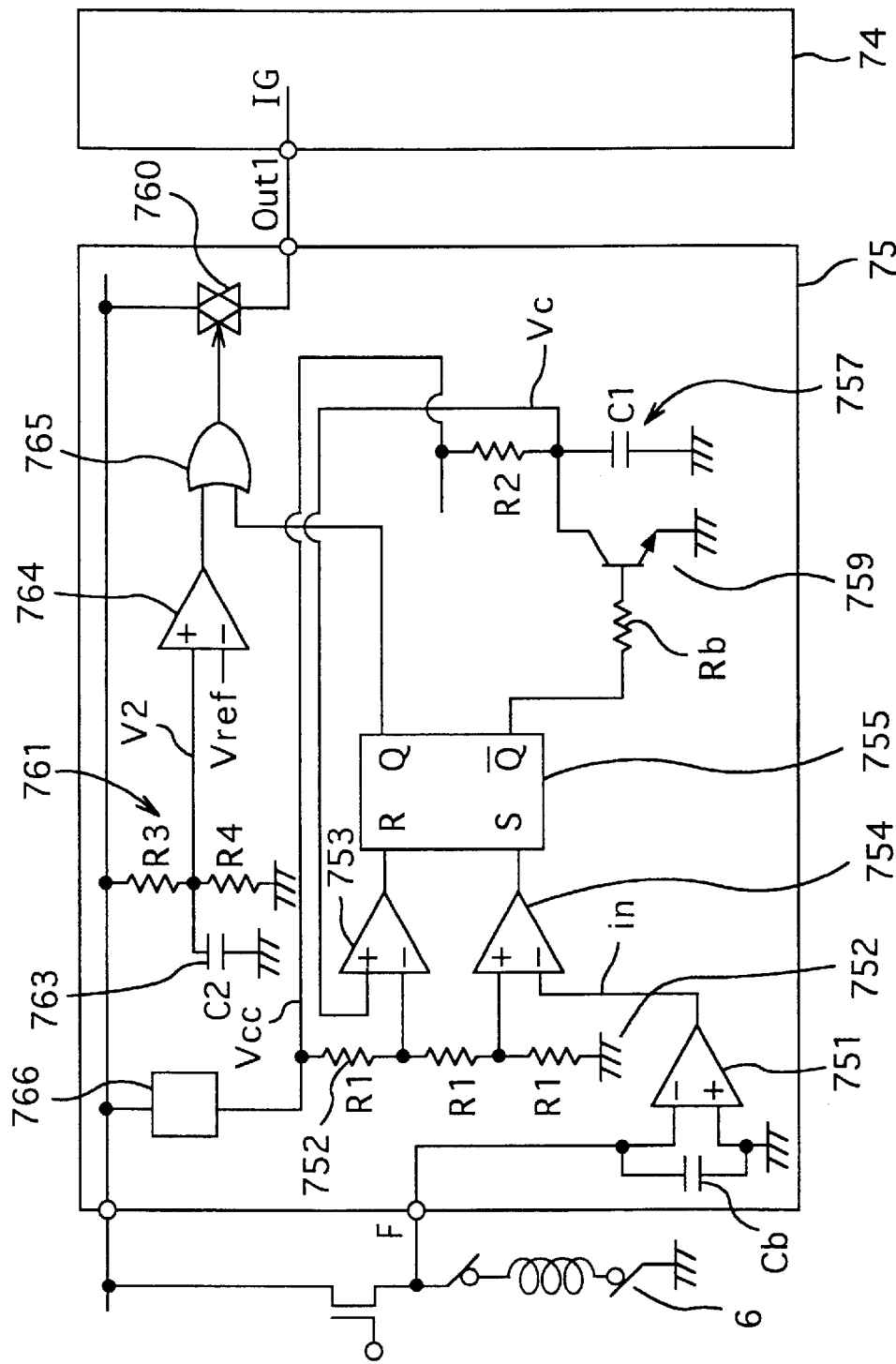
FIG. 2 is a schematic view showing a circuit of power supply hold means (first embodiment)

FIG. 2 shows the power supply drive circuit 75.

As shown in FIG. 2, the power supply drive circuit 75 includes a first comparator 751, a resistor group 752, a second comparator 753, a third comparator 754, an RS flip-flop 755, a CR integrating circuit 757, and a transistor 759. The first comparator 751 compares a one-end voltage of the field coil with a predetermined constant voltage (ground potential in the present embodiment). The resistor group 752 divides a supply voltage Vcc. Each resistor forming the resistor group 752 is required to have same resistance. The second comparator 753 compares two-thirds of the supply voltage Vcc with an output of the CR integrating circuit 757. The third comparator 754 compares an output voltage of the first comparator 751 with one-third of the supply voltage Vcc. The RS flip-flop 755 receives an output of the second comparator 753 at a reset terminal thereof and receives an output of the third comparator 754 at a set terminal thereof. The CR integrating circuit 757 comprises a capacitor C1 and a resistor R2 connected in series with each other. The transistor 759 receives an inverted Q output from the flip-flop 755 through a base resistor Rb and causes the capacitor C1 to discharge.

The power supply drive circuit 75 further includes a resistance voltage divider circuit 761, a condenser 763, a comparator 764, an OR gate 765, a voltage regulator circuit 766, and an analog switch 760.

The resistance voltage divider circuit 761 comprises resistors R3 and R4 connected in series with each other and outputs a divided voltage V2 of the DC output voltage from the alternator 1. The condenser 763 is connected in parallel with the resistor R4 to eliminate a high-frequency component from the divided voltage V2. The comparator 764 compares the divided voltage V2 with a predetermined voltage Vref. The OR gate 765 attains an OR of a Q output of the flip-flop 755 and an output of the comparator 764. The voltage regulator circuit 766 reduces the DC output voltage of the alternator 1 and forms a constant supply voltage Vcc. The analog switch 760 is actuated with the output of the OR gate 765 and turns ON and OFF of the electric power to be fed to the IG terminal of the main power supply circuit 74.

A high-frequency bypass condenser Cb is connected between a pair of input terminals of the comparator 751. The bypass capacitor Cb prevents malfunctioning of the comparator 751 caused by mixing of a high-frequency noise voltage in the ground potential. Although the field coil induced voltage generated by residual magnetism upon starting of rotation of the vehicular AC generator is an AC voltage, the attenuation effect by the high-frequency bypass condenser Cb is small because the induced voltage has a low frequency.

Figure 3:
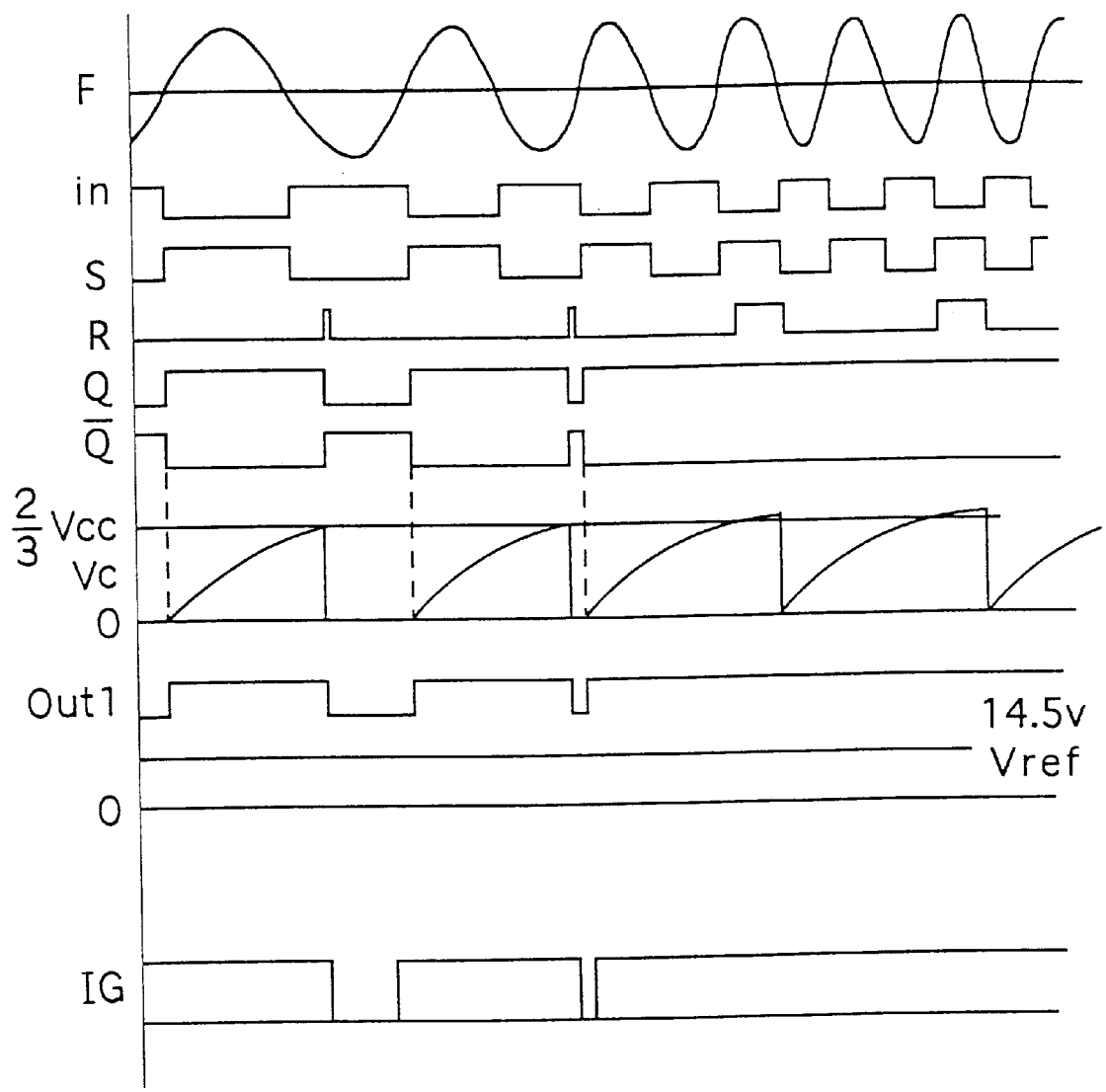
FIG. 3 is a timing chart showing states of various portions (first embodiment)

An operation of the power supply drive circuit (power supply hold means in the present invention) 75 will be described with reference to FIG. 3.

Magnetism remains in each core of the alternator 1 as a result of the previous power generation. In the field coil 6, with rotation of the rotor, a combined residual magnetism of the residual magnetism in the field core and the residual magnetism in the armature core, fluctuates periodically with respect to the field poles, so that a residual magnetic flux formed by the combined residual magnetism is interlinked with the field winding, fluctuates periodically, whereby an AC voltage is induced.

That is, in a space distribution of the residual magnetism in the armature core, N and S poles are alternately created circumferentially on an inner peripheral surface of the armature core in accordance with standstill positions of pawl-like field poles of the rotor and in a total number matching the total number of field poles. As a result, due to rotation of the field poles, the magnetic flux formed by the residual magnetism of the armature core and interlinked with the field winding 6 undergoes a periodic change, whereby an AC voltage is generated in the field coil 6. At this time, the switch 71 is assumed to be OFF. For example, the amplitude of the AC voltage is about 0.2–0.4V and the frequency thereof is P1□N/60 [Hz], assuming that the number of rotating magnetic poles is 2P1 and the number of rotations is N [rpm].

The comparator 751 compares the AC voltage with a constant voltage (the ground potential in the present embodiment) and outputs a rectangular pulse voltage "in" with a duty ratio of 50% and a frequency of P1□N/60. The rectangular pulse voltage "in" is input to the third comparator 754, in which it is compared with a divided voltage Vcc/3 and of which output is received by the set terminal of the flip-flop 755. here, by seeing the reference voltage to a voltage other than the ground potential, it is possible form a rectangular pulse of a desired duty ratio.

The output of the CR circuit 757 (the first timer) is input to the second comparator 753 and is compared with a divided voltage 2□Vcc/3. Thus, when the output of the CR circuit 757 has reached the divided voltage 2□Vcc/3, the second comparator 753 outputs a Hi level signal to reset the flip-flop 755.

While the output of the second comparator 753 is Lo, that is, while the output of the CR circuit is 2□Vcc/3 or less, the Q output of the flip-flop 755 is Hi, the inverted Q output thereof is Lo, the transistor 759 turns OFF, and the condenser C1 is charged. When the condenser C1 is charged and the potential Vc reaches 2□Vcc/3, the flip-flop 755 is reset to turn the transistor 759 ON and the condenser C1 is discharged. After all, the flip-flop 755 outputs Hi level signals while the condenser 757 is charged, that is, during a certain period substantially equivalent to the time constant of the CR circuit 757. When the output of the flip-flop 755 is at Hi level, the switch 760 which supplies electric power to the IG terminal of the power supply circuit 74 is kept ON, thereby allowing the power supply circuit 74 to operate.

When the number of rotations is small, the CR time constant of the CR circuit 757 is shorter than the set input cycle of the flip-flop 755, so that the set input is Lo when the flip-flop 755 is reset, that is, when the potential of the condenser C1 becomes 2☐Vcc/3. Next, until the set input becomes Hi, the flip-flop 755 maintains Lo output and an output Out1 of the power supply drive circuit 75 is kept at Lo.

When the number of rotation exceeds a predetermined number, the set input cycle of the flip-flop 755 becomes shorter than the CR time constant, so that when the flip-flop 755 is reset, that is, when the potential of the condenser C1 becomes 2☐Vcc/3, the set input is also Hi. The flip-flop 755 continues to output Hi level signals and the output Out1 of the power supply drive circuit 75 is held Hi. That is, as the number of rotation increases, the frequency of the voltage induced in the field coil 6 becomes high and the OFF period of the output Out1 is shortened gradually and finally turns ON continuously. Thus, the power supply circuit 74 is held ON continuously, with intermittent operations being performed in a region of low rotation and with a shift being made to a continuous operation at a certain number of rotation or more.

For example, In an alternator having twelve poles (6-pole pairs), when R2 is set at 100 kΩ and C1 at 0.1 μF, a continuous operation can be done at about 1000 [rpm]. Generally, when an alternator having 2☐P1 poles is to be operated continuously at N1 [rpm], it can be done by setting the time constant of the CR circuit 757 to 60/(P1☐N1) [sec].

That is, in the present embodiment, since whether electric power is to be supplied or not is determined by comparing the cycle of a field coil induced voltage with residual magnetism (a frequency-related signal voltage, a rotation induced electric signal) with the time constant of the CR circuit (the first timer) 757, it is possible to determine that the number of rotation has reached a predetermined number or more and hence possible to supply electric power stably to the control circuit.

In case of using the RS flip-flop 755, when both set and reset inputs are Hi, the flip-flop output becomes uncertain. Therefore, an output voltage of the alternator 1 is detected by the resistance voltage divider circuit 761, and is compared with a reference voltage higher than an open terminal voltage of the battery by means of the comparator 764, then a Hi level signal is outputted when the output voltage of the alternator 1 is higher than the reference voltage, Vref, and the gate of the switch 760 is enabled with an OR signal of the signal and the output Out1, whereby the operation can be made still more stable.

By passing the result of the comparison between the output voltage of the alternator 1 and the reference voltage higher than the open terminal voltage of the battery through the OR gate, it is possible to further attain the following advantage.

Consideration is now given to the process of stopping the vehicular engine at the end of vehicular running. Usually, since the battery is maintained in a substantially fully charged state, its terminal voltage, i.e., an input voltage of the comparator 764 is of a value corresponding approximately to 14.5V and the output of the comparator 764 is Hi. When the driver of the vehicle stops the engine, the alternator 1 also turns OFF immediately. But the main power supply of the voltage control unit in the alternator 1 is still active with Hi signal received from the comparator 764. Therefore, an exciting current is continued to be supplied to the field coil 6 in the alternator 1 at an approximate duty ratio. The battery terminal voltage finally drops to a no-load voltage of approximately 12.8V due to disappearance of charging polarization for example, so that the output of the comparator 764 is inverted to disable the power supply circuit 74.

Since the conventional vehicular battery utilizes a chemical reaction, several ten seconds are required from the time when the engine stops and so does the power generation of the alternator 1 until when the power supply circuit 74 in the voltage control unit turns OFF and the exciting current flowing in the field coil 6 becomes extinct completely.

In the present embodiment, therefore, the phenomenon that the attenuated exciting current of the field coil 6 demagnetizes the armature core at the time of stopping the rotation is realized by delaying the stop of power supply to the control circuit on the basis of the battery voltage, i.e., the DC output voltage of the alternator 1. Thus, also at the next time of engine start-up, the voltage control unit in the alternator 1 can be restored positively to its stand-by state. Here, delaying the stop of power supply to the control circuit may be realized not by a change of the DC output voltage but by a change in frequency thereof or by a change in generated voltage or frequency of the armature coil.

In the present embodiment, there is shown an example of having realized the timer function by an analog signal processing which utilizes the time constant of the CR circuit. The same advantage can be obtained also by a digital signal processing which utilizes any of various digital counters. FIG. 3 shows potential states of various portions.

(Modification)

Figure 4:
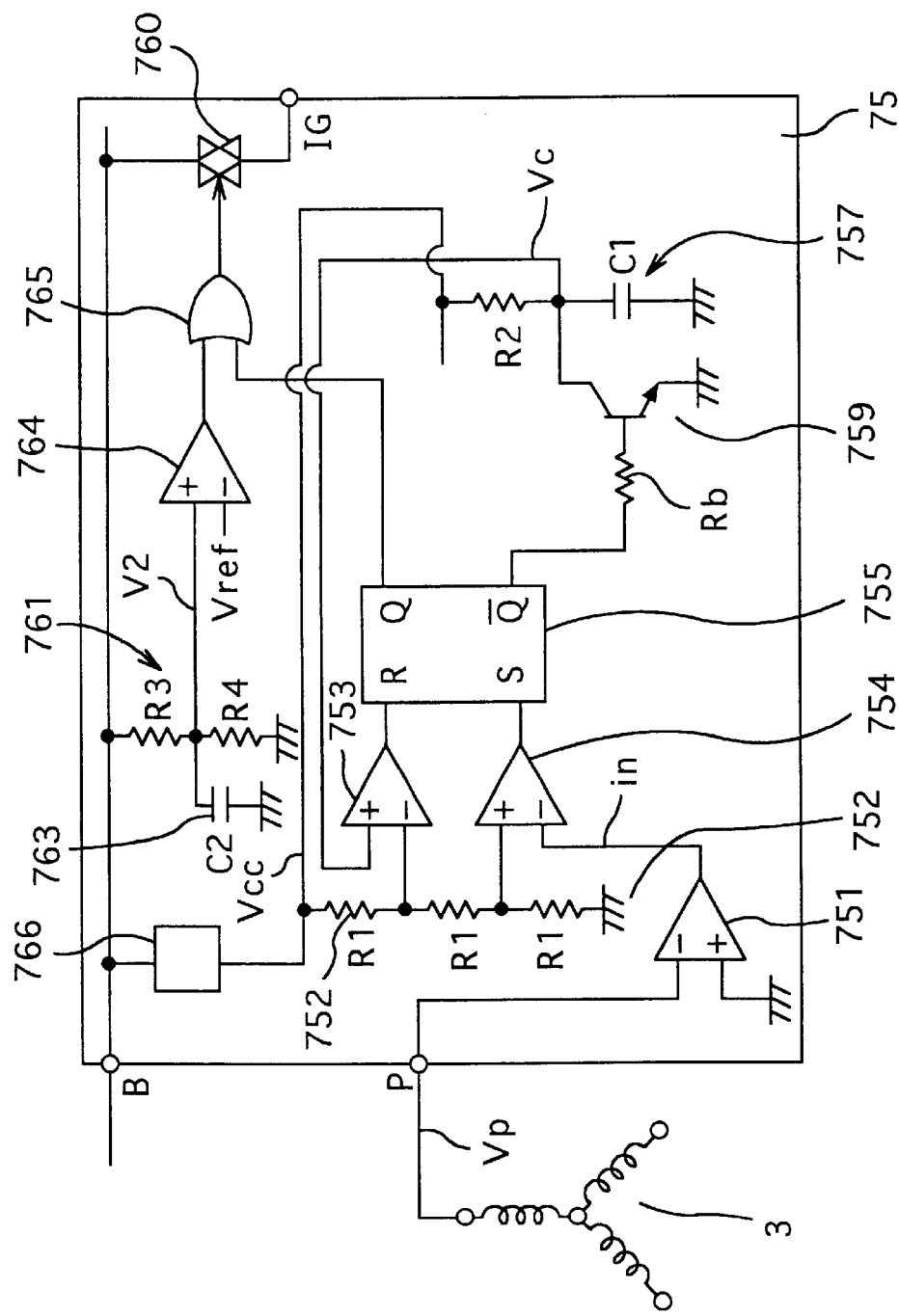
FIG. 4 is a schematic view showing a circuit of power supply hold means (modification)

FIG. 4 shows a modification of the first embodiment.

In the above-described first embodiment, an induced AC voltage in the field coil 6 is detected and used as a trigger signal for triggering the power supply circuit. Alternatively, in this modification, a one-phase output voltage from the armature coil 3 is detected and used as a trigger signal. The operation is the same as in the first embodiment.

Second Embodiment

Figure 5:
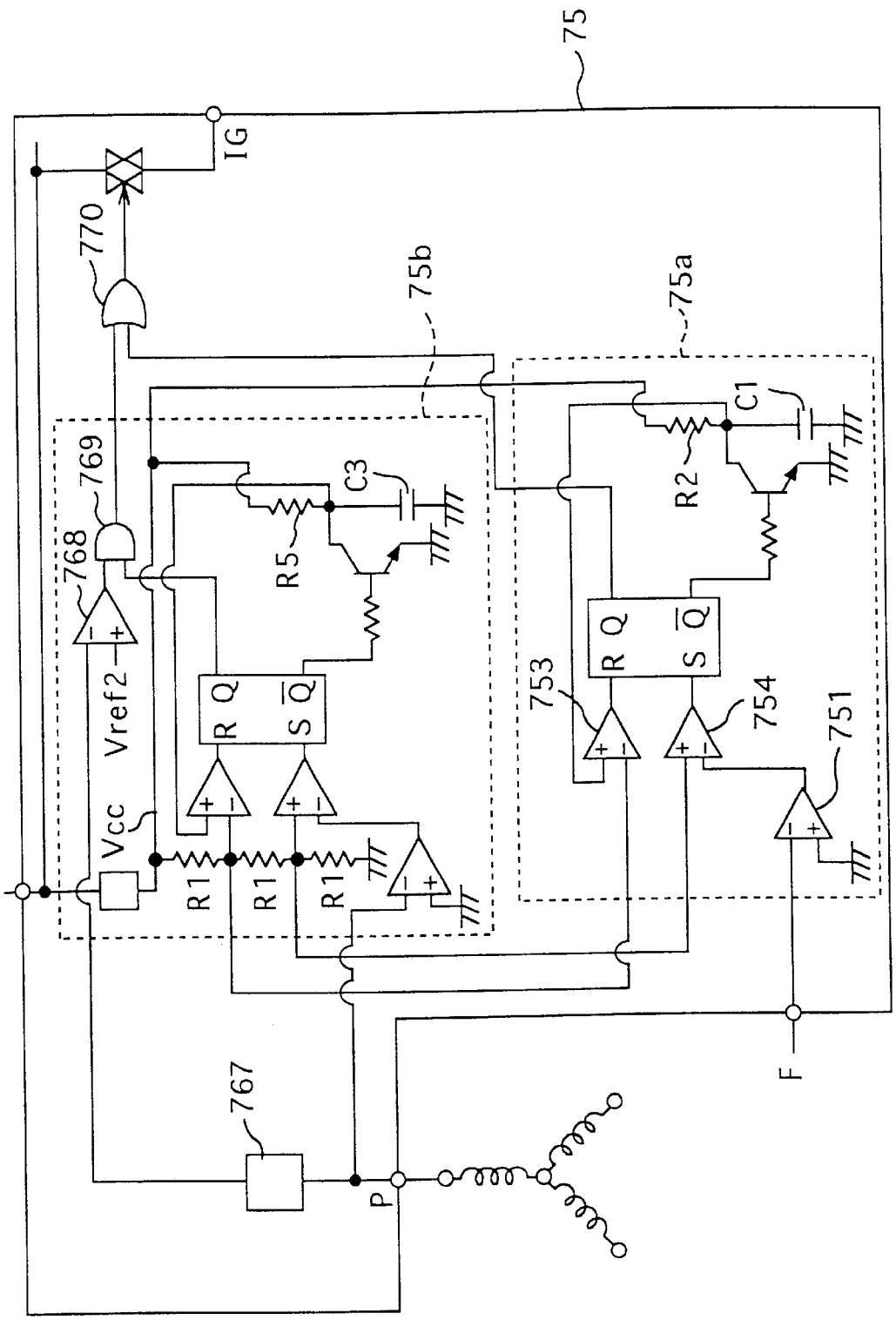
FIG. 5 is a schematic view showing a circuit of power supply hold (second embodiment)
Figure 6:
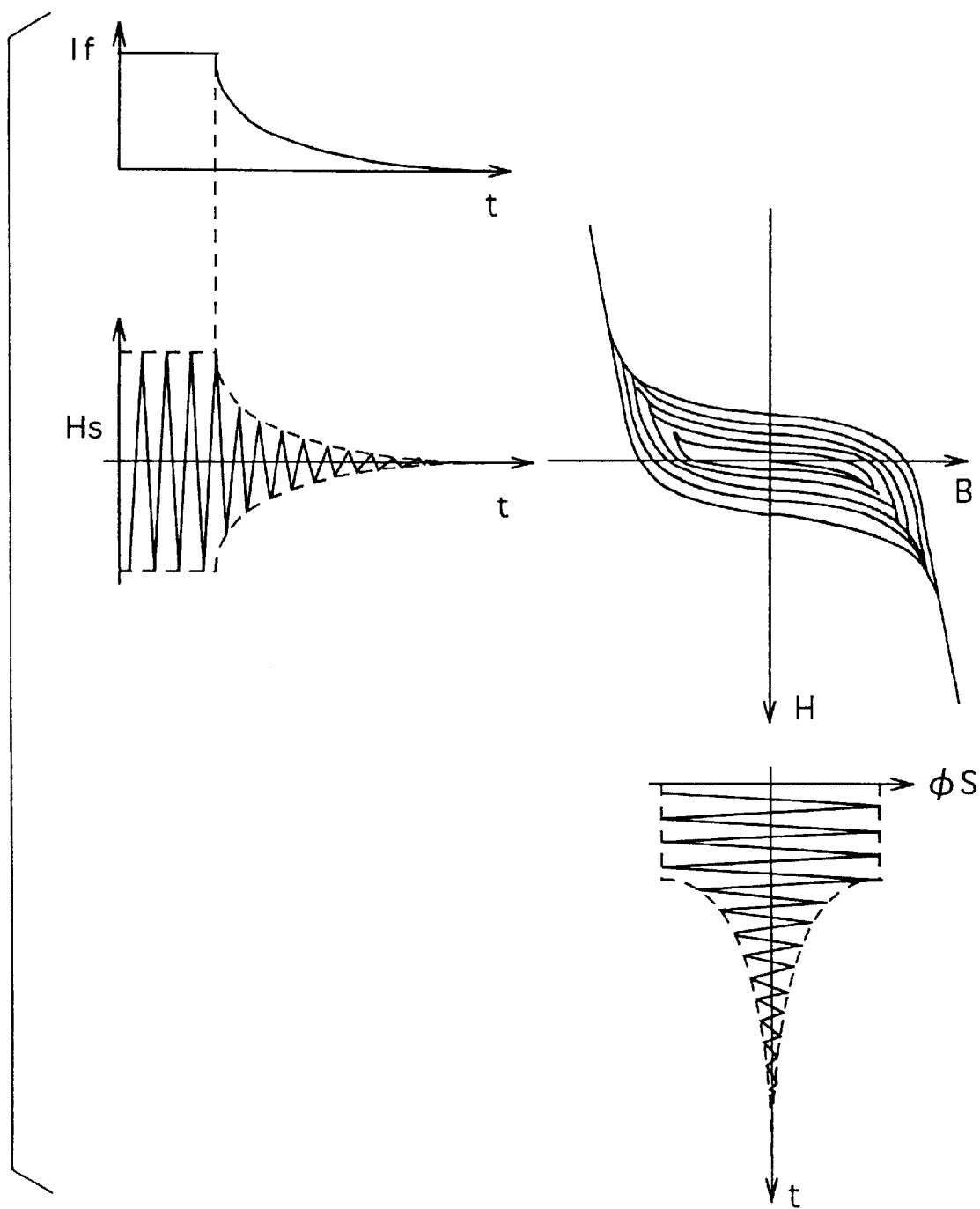
FIG. 6 is a characteristic diagram showing an AC demagnetization process of an armature core.

The second embodiment of the present invention will be described with reference to FIG. 5.

A power supply drive circuit 75 used in the second embodiment is characterized by using in parallel both a first power supply drive circuit portion 75a having a function equal to that of the first power supply drive circuit 75 shown in FIG. 2, and which operates with the field coil voltage and a second power supply drive circuit portion 75b having a function almost equal to that of the power supply drive circuit 75 shown in FIG. 4, and which operates with the armature coil voltage. Here, a duration time Hi output from the comparator 753 and is compared with a divided voltage 2☐Vcc/3. Thus, when the output of second power supply drive circuit 75b (a time constant of a CR circuit (the second timer) constituted by a series circuit of both condenser C3 and resistor R5) C3R5 is set fully long in comparison with the duration time C1R2 of Hi output from the first power supply drive circuit 75a.

Further, the power supply drive circuit 75 in the second embodiment includes detector means 767 for detecting a frequency component of the output voltage from the armature coil 3, e.g., a known F/V converter, a comparator 768 which compares an output of the detector means 767 with a predetermined constant voltage, an AND gate 769 which calculates the AND of a Q output from the second power supply drive circuit portion 75b and an output from the comparator 768, and an OR gate 770 which ORs an output of the AND gate 769 with an output of the first power supply drive circuit portion 75a.

An operation of the second embodiment will be explained.

As to the operation of the first power supply drive circuit portion 75a, an explanation thereof will here be omitted because it is the same as in the first embodiment.

The second power supply drive circuit 75b is the same as in the modification of the first embodiment. Here, in the case where the output of the frequency detector 767 is larger than the predetermined frequency Vref, the comparator 768 outputs a Lo level signal. As a result, in the normal state of power generation in which the number of rotation is large, the output of the second power supply drive circuit portion 75b is rendered invalid.

When the engine has entered a stopping process, with drop in the number of rotation of the alternator 1, and the frequency of the AC voltage in the armature coil has lowered to a frequency corresponding Vref 2 or less, the comparator 768 outputs a Hi level signal and the output of the second power supply drive circuit 75b is input to the OR gate 770. At this time, since a Hi output period T2 while a Hi level signal is output from the circuit 75b is sufficiently longer than a Hi output period T1 while a Hi level signal is outputted from the circuit 75a, the OR gate 770 continues to output Hi level signals for a certain period even after decrease in the number of rotation and complete stop of the engine, so that the power supply circuit 74 is kept ON. As long as the power supply circuit 74 is kept ON, an exciting current continues to flow in the field coil 6, so that a magnetic field of a direct current continues to be applied to the armature core, thereby allowing power generation to be started easily when the engine is next to be started.

That is, in the second embodiment, the supply of electric power to the control circuit 3 is continued for a short period of time even after complete stop of rotation based on the generated voltage in the armature coil to prevent an AC demagnetization.

Third Embodiment

The third embodiment will be described with reference to FIG. 7.

Figure 7:
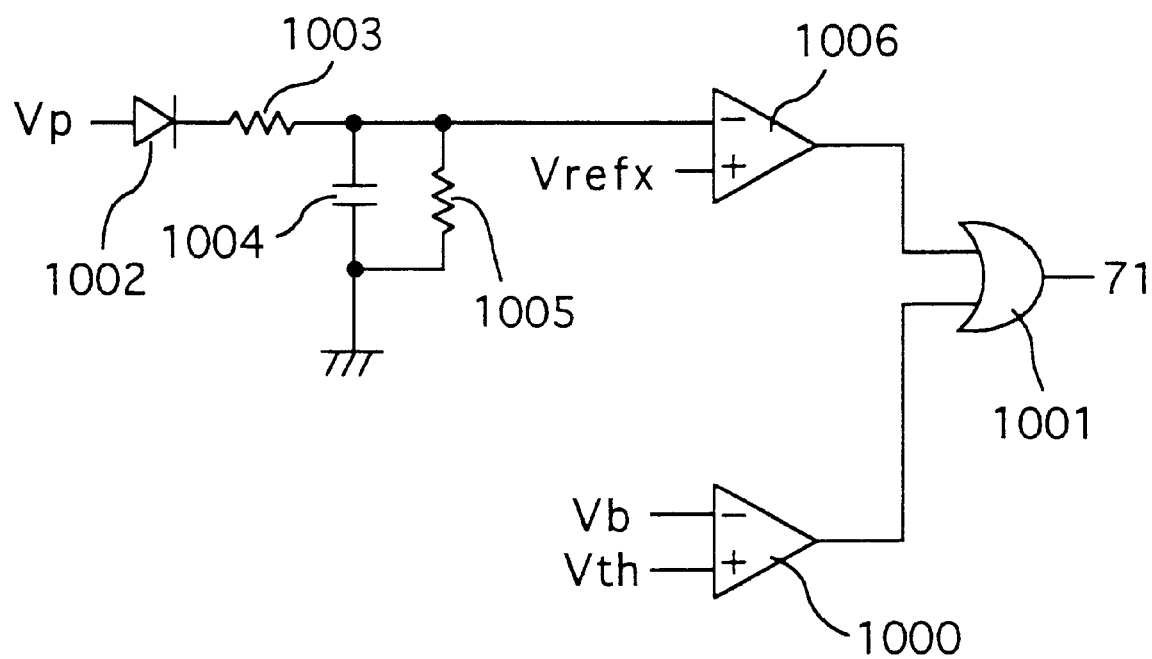
FIG. 7 is a schematic view showing a control circuit of a transistor for turning ON-OFF of field current (third embodiment).

As shown in FIG. 7, the third embodiment includes a comparator 1000, an OR gate 1001, a diode 1002, resistors 1003 and 1005, a condenser 1004, and a comparator 1006.

The comparator 1000 compares a regulated voltage Vth with a battery voltage Vb. An output of the comparator 1000 controls the transistor 71 through the OR gate 1001, and a DC output voltage is controlled for convergence to the regulated voltage Vth. The diode 1002 half-wave rectifies one-phase armature coil voltage (generated voltage) Vp.

The one-phase armature coil voltage (generated voltage) Vp is half-wave rectified by the diode 1002 and charges the condenser 1004 through the resistor 1003, and the condenser 1004 is discharged through the resistor 1005.

In a normal power generation stage in which the rectified voltage of the onephase armature coil voltage (generated voltage) Vp exceeds a predetermined value Vrefx, the comparator 1006 outputs a Lo level signal, while in an initial stage of rotation in which the number of rotation is smaller than a predetermined number and during and after the stop of rotation, the comparator 1006 outputs a Hi level signal. As a result, in the initial stage of rotation and during and after the stop of rotation, the OR gate 1001 is supplied with a field current.

By this, when the number of rotation has decreased below the predetermined value due to the stop of rotation, the field current flows sufficiently through the field coil 6 to prevent an AC demagnetization. Thereafter, the supply of line voltage to the control circuit 73 is cut off to prevent wasteful supply of the field current and power consumption in the control circuit 73. Similarly, in the first and second embodiments, the supply of electric power to the control circuit 73 is not started yet in the initial stage of rotation, whereby wasteful supply of the field current is prevented.

Thus, irrespective of the value of the battery voltage Vb, a sufficient supply of the field current is ensured even after the stop of rotation is completed, so that AC magnetization does not occur.

(Modification)

In the above-described embodiments, the amplitude of the generated voltage Vp was used. Alternatively, the frequency thereof may be used, or the DC output voltage or the amplitude thereof may be used.

In the above-described embodiments, a forced supply of the field current was started during the deceleration period for the stop of rotation. Alternatively, it may be done after the completion of rotation stop and before the end of power supply. For example, in the circuit of FIG. 7, Vrefx may be set at 0V.

What is claimed is:

1. A voltage control unit for a vehicular AC generator, comprising:

a rotor having a field core including a plurality of field poles formed thereon;

a field coil to which a field current for magnetizing said field poles is supplied;

a diode for current return connected in parallel with said field coil;

an armature having an armature core including a polyphase coil applied thereon;

a rectifier circuit for rectifying a voltage generated from said polyphase coil and outputting the voltage as a DC output voltage, the DC output voltage being controlled by adjusting the field current;

switch means for switching between ON and OFF of the field current;

a control circuit for controlling said switch means in accordance with a signal associated with the DC output voltage;

a power supply circuit for supplying electric power to said control circuit; and power supply hold means for holding the supply of electric power to said control circuit by said power supply circuit for a period from just before stop of rotation of said rotor until lapse of a predetermined time after the stop of rotation of said rotor.

2. A voltage control unit according to claim 1, wherein based on a rotation-induced electric signal associated with the rotation of said rotor or the signal associated with the DC output voltage, said power supply hold means holds said power supply circuit in an active state during a predetermined period from a time when a number of rotation of said rotor has decreased smaller than a predetermined number until exceeding a predicted time-point of normally rotation stop of said rotor.

3. A voltage control unit according to claim 1, wherein said switch means is not turned OFF for a predetermined time or more at least during a period from just before the stop of rotation of said rotor until after a completion of the rotation stop.

4. A voltage control unit according to claim 3, wherein the switch means is turned ON continuously during the period.

5. A voltage control unit according to claim 1, wherein said power supply hold means causes the supply of electric power to said control circuit by said power supply circuit to start when a number of rotation of said rotor is more than a predetermined number, based on a rotation-induced electric signal associated with the rotation of said rotor.

6. A voltage control unit according to claim 5, wherein the rotation induced electric signal is formed by a field coil induced voltage with residual magnetism induced in said field coil by interlinkage of a residual magnetic flux in said armature core with said field core during rotation of the rotor or by an armature coil induced voltage with residual magnetism induced in said polyphase coil by interlinkage of a residual magnetic flux in said field core with said polyphase coil.

7. A voltage control unit according to claim 6, wherein said power supply hold means includes:

timer means which operates when the number of rotation has reached a predetermined value by the field coil or armature coil induced voltage with residual magnetism as the rotation induced electric signal; and comparator means for determining whether the DC output voltage has exceeded a predetermined voltage or not, wherein said power supply hold means causes the supply of electric power to said control circuit by said power supply circuit to start in accordance with an OR output of both output of said timer means and output of said comparator means.

* * * * *